(12) United States Patent
Abraham

(10) Patent No.: US 6,592,134 B2
(45) Date of Patent: Jul. 15, 2003

(54) LADDER TRANSPORT SYSTEM

(75) Inventor: Richard J. Abraham, Ventura, CA (US)

(73) Assignee: Inovent, Inc., Ventura, CA (US)

( * ) Notice: Subject to any disclaimer, the term of this patent is extended or adjusted under 35 U.S.C. 154(b) by 0 days.

(21) Appl. No.: 09/792,526

(22) Filed: Feb. 23, 2001

(65) Prior Publication Data

US 2002/0117821 A1 Aug. 29, 2002

(51) Int. Cl.$^7$ ................................................. B62B 1/18
(52) U.S. Cl. ........................ 280/79.7; 280/47.3; 16/29; 16/30
(58) Field of Search ................... 16/29, 30; 280/30, 280/47.3, 47.31, 47.315, 47.32, 63, 78, 645, 79.7

(56) References Cited

U.S. PATENT DOCUMENTS

| | | | | |
|---|---|---|---|---|
| 55,567 | A | * 6/1866 | Wilkins | ........................ 16/29 |
| 115,060 | A | * 5/1871 | Jones | ............................ 16/29 |
| 127,571 | A | * 6/1872 | Clark | ............................ 16/29 |
| 274,448 | A | * 3/1883 | Kinzel | ............................ 16/29 |
| 1,004,550 | A | * 10/1911 | Bertke | ........................ 280/35 |
| 3,463,505 | A | * 8/1969 | German et al. | ............ 280/79.2 |
| 3,580,601 | A | 5/1971 | Miles | |
| 3,841,437 | A | 10/1974 | Caughey | |
| 4,049,283 | A | 9/1977 | Brookes et al. | |
| 4,063,616 | A | 12/1977 | Gutierriez | |
| 4,564,203 | A | 1/1986 | Wilson | |
| 5,082,086 | A | 1/1992 | Kerr | |
| 5,086,872 | A | 2/1992 | Lin | |
| 5,105,908 | A | 4/1992 | Freund | |
| 5,153,966 | A | * 10/1992 | Godwin | ................... 280/47.31 |
| 5,232,233 | A | 8/1993 | Jedora | |
| 5,382,032 | A | 1/1995 | Wilson | |
| 5,566,780 | A | 10/1996 | Bambrough | |
| 5,794,307 | A | * 8/1998 | Overcash et al. | ........ 280/47.31 |
| 6,328,330 | B1 | 12/2001 | Haaser | |

* cited by examiner

Primary Examiner—Avraham Lerner
(74) Attorney, Agent, or Firm—Thomas N. Giaacherini

(57) ABSTRACT

Method and apparatus for removably affixing a wheel assembly (20) near the end and the edge of a leg (24,27) of nearly any existing or newly manufactured ladder (22) to aid a person (26) transporting the ladder (22). A preferred embodiment includes a first wheel (30a) and a second wheel (30b) whose axles (32a, 32b) are disposed orthogonally. Each axle (32a, 32b) is supported by a bracket (34a, 34b) coupled to a clamp frame (36) which is clamped to said leg (24,27). When the ladder (22) is placed, edge parallel to a supporting surface (28), and a person (26) carries the opposite end of the ladder, the wheel (30b) will roll on that surface (28). When the ladder (22) face is placed parallel to a supporting surface (28) and a person (26) carries the opposite end of the ladder, the wheel (30a) will roll on that surface (28). The wheel (30a, 30b) will carry a large portion of the weight of the ladder (22). For persons who use ladders frequently, the system can prevent personal injuries. The wheel assembly (20) does not interfere with erection or use of the ladder (22).

1 Claim, 8 Drawing Sheets

LADDER TRANSPORT SYSTEM

FEDERALLY SPONSORED RESEARCH OR DEVELOPMENT

None.

FIELD OF THE INVENTION

The present invention pertains to methods and apparatus for assisting a person when, alone or with others, he or she moves a ladder from place-to-place, as for example, from its storage place to a work site or one work site to another.

BACKGROUND OF THE INVENTION

Many kinds of ladders and stepping-stools are known which are mounted on wheels and casters that automatically or manually retract when a person's weight is placed on their steps. The casters facilitate movement of the ladder from one location to another. For safety purposes, the casters retract so that the ladder legs rest on the supporting surface, usually a floor or the ground. Some ladders are either too large or too cumbersome for one person to carry easily and without potential for injury. Some of these ladders use caddies, dollies or wheeled attachments to facilitate transport by a single person. However, many ladders are made with no such device.

U.S. Pat. No. 4,564,203 to Ronald Williams and dated Jan. 14, 1986, discloses an aid for transporting a narrow oblong object (such as a ladder leg 72. His device does not permit the ladder to be erected on the wheel-supported end without removing the concave socket and wheel assembly (releasable embodiment 70). Therefore this embodiment of the device is not easily usable on the step ladder shown earlier in the drawings since it can only be placed on the free end of the step ladder legs 33 and must be removed before that ladder can be erected in order that an appropriate surface support the ladder legs. That embodiment 70 is also not easily used on an extension ladder. Assuming that it is clamped to the topmost end of an erect ladder, an irregular and flimsy element 74, 79 is then placed against the wall against which the ladder top is supported, a potential safety hazard. If it is placed on the lower segment of the ladder, the socket interferes with the upper segment's flush fit on the lower segment. In order to transport the it, the ladder must be fully lowered and then swung right or left or allowed to drag down the surface against which it was leaning in order to place the wheel on the ground or other supporting surface. This is difficult to do with very long or heavy ladders. The most appropriate position for this device being at the lower ends of the ladder legs, the user is compelled to remove it in order to safely mount the ladder. Williams has provided a narrow wheel for end support. His wheel, therefore, must be moved from side-to-side and pinned in place to prevent the ladder from tipping. Finally, since the ladder leg must fit into the concave socket 73, such a socket can not be sized universally for all sizes and shapes of ladder legs.

In his U.S. Pat. No. 3,580,601, dated May 25, 1971, Ray P. Miller discloses a skate device for transporting unwieldy, flat objects with ease. The device comprises an elongated base member containing a pair of brackets at each end and a clamping bracket member at its midsection. Rollers are provided on the bottom of the base member and are all in line. The end rollers are mounted slightly above the midsection roller to enable the skate to be tipped backward or forward on the end rollers for maneuverability. The skate is clamped to an edge of the flat object for transporting. Miller's device is limited to placement along a thin edge of flat, heavy objects with large surface areas (col. 1, line 3–5) such as doors, sheet rock, plywood, etc. Its elongated base member is large, heavy, and can not reasonably be left in place on an ordinary ladder in use and therefore has marginal utility for ladder transport.

U.S. Pat. No. 5,566,780, dated Oct. 22, 1996 was issued to Harry M. Hambrough. It describes a combination cart and ladder apparatus including a first and a second ladder assembly. Such devices are often used for hunting. A pair of wheel assemblies are supported by the first ladder assembly at preselected positions on its length. Translation of the second ladder assembly with respect to the first ladder assembly is not interfered with by the wheel connection assemblies. A first platform assembly is connected to distal ends of second lateral support members. A stop element is connected to a bottom side of the first platform element. The stop element includes a fixed portion connected to the first platform element and a free-end portion projecting from the fixed portion at an obtuse angle. A strap assembly is connected to the first platform element and connects the apparatus to a tree. When the combination cart and ladder is used to provide an elevated platform in a tree, the fork assembly which holds the wheels is adjusted so they are no longer in contact with the ground. Wheel brakes are, therefore, not needed. Applicants' wheels need no adjustment when the ladder is erected since they are placed in a position which obviates their contact with ground except when the ladder is being transported. Applicants' ladder with transport attachment is not intended to be used as a cart for moving other objects.

Peter DiSario's U.S. Pat. No. 5,727,799 presents a dolly for supporting a ladder during movement to a work site. The dolly has a frame adapted to be attached by clips to the rungs of the ladder. The dolly has a single, relatively large wheel in terms of ladder width pivotally mounted on the frame for supplying rolling support in order to enable a single individual to move a long, heavy ladder over sloping or rough ground. The wheel assembly is very large and because of its position in the center of the ladder side rails or legs where the user would ordinarily mount the ladder, it prohibits use of the ladder when it is erected, unless the wheel and frame are completely removed or the ladder can be placed against a wall allowing clearance for the wheel. With DiSario's caddy, the ladder cannot be transported on its edge.

U.S. Pat. No. 5,086,872 to Fan-Nam Lim discloses a foldable ladder equipped with a pair of wheels so the ladder can be converted into a push cart for transportation of various goods with ease. The foldable ladder is made up of a number of sections joined together one by one by adjustable knuckles which can be put in a number of positions so the ladder can be transformed into a plurality of forms of cart when a pair of wheels are removably attached to the bottom of the ladder. The heavy-duty wheels and axle are not easily removed, being bolted to the ladder legs and spanning across the width of the ladder. This configuration permits transport of the ladder device basically as a cart, the width being constrained parallel to the supporting surface, floor or ground. As a result, the ladder can not be transported on edge as may be required to pass through narrow doorways.

Brookes et al. in their U.S. Pat. No. 4,049,283 describe a caddy for transporting a heavy ladder to a work site. The caddy is formed of a pair of transverse pieces having resilient clips installed thereon adapted to engage and clamp onto any rung of the ladder. The pieces are attached at spaced positions to the bridge of a two-wheeled carriage so that the pieces are adapted to straddle and engage a pair of adjacent rungs on the ladder in wheel-barrow position. The caddy must be disengaged and removed from the ladder before the ladder can be erected for use.

James R. Wilson in his U.S. Pat. No. 5,382,032, dated Jan. 17, 1995 discloses a wheeled stepladder dolly wherein the dolly is engageable with both a step of the ladder and existing cross braces on the support portion of a conventional stepladder to temporarily hold the step ladder in fixed relationship with the dolly, thus providing a stepladder dolly assembly to be used for transporting heavy boxes of tools and the like. The engagement means are adjustable and configured to be adaptable for a number of brands and varieties of commercially available stepladders. Wilson describes a means for transporting a stepladder and heavy objects placed on the face of the ladder. However, it appears that the step ladder must be disengaged from the dolly before it can be used as a ladder. In addition this device does not appear suited for long ladders unless they can be folded or collapsed somehow. The ladder can not be transported on edge with this device.

U.S. Pat. No. 5,105,908 was issued to Harvey J. Freund on Apr. 21, 1992. It reveals a kit which may be used to convert a ladder tree stand into a towable trailer that may be connected to a motorized vehicle. The trailer kit comprises a transport frame, tow frame attachment members, associated bolts and clamping plates. This conversion takes considerable time to assemble, is very large and heavy and is clearly not suitable for transporting a ladder from work site to work site by a single individual using only his or her own effort.

U.S. Pat. No. 5,232,233 by John Jedora describes a portable wheel assembly provided with a parallel type clamping system for attachment to objects, such as the transom of a car-top boat. An improved clamping effect is obtained by using "U" shaped tubing that embraces the wheel. While such a device might be adaptable in some way to transport a heavy ladder, Jedora does not indicate how this might be done. The wheel assemblies are complicated, very large, heavy, and relatively expensive for the purposes desired by Applicants.

U.S. Pat. No. 5,882,023 issued to William F. Swager discloses a wheeled transport device for maneuvering elongated objects in a simplified manner. It is remarkably similar in form and function to DiSario's Patent described above. FIG. 1 shows a relatively large wheel on an axle disposed on a frame which is connected by brackets to the steps of a ladder. As in DiSario's device, the wheel assembly is very large and because of its position in the center of the ladder side rails or legs where the user would ordinarily mount the ladder, it prohibits use of the ladder when it is erected, unless the wheel and frame are completely removed or the ladder can be erected with the wheel facing a wall. Additionally, as with DiSario's caddy, the ladder cannot be transported on its edge.

In U.S. Pat. No. 3,841,437 by John W. Caughey, issued Oct. 15, 1974, a stool suitable for standing upon to reach high places is described. The stool includes an upstanding post to be grasped by the user and includes a roller which is normally inactive but which, when the stool is tilted, becomes active enabling the stool to be rolled about easily.

U.S. Pat. No. 4,063,616 to Ernest F. Gutierrez, issued Dec. 20, 1977 discloses a safety ladder assembly having a plurality of steps and at least three support feet for supporting the ladder on a horizontal surface. The assembly includes a caster assembly having at least three casters providing for rollingly transporting the ladder from one location to another. The casters are conjointly movable between a retracted storage position in which the support feet stably support the ladder on a horizontal surface and a second transporting position in which they stably support the ladder on the horizontal surface with the support feet elevated so the ladder may be rollingly transported along the surface. A linkage interconnects the casters so that they may be raised and lowered via actuating and retracting pedals.

U.S. Pat. No. 5,082,086 was issued to James F. Kerr on Jan. 21, 1992. The patent discloses a ladder including wheels normally received off the ground, and four legs normally supporting the ladder. When it is desired to move the ladder, it is pivoted off the legs until the wheels contact the ground and fully support the ladder. The ladder may then be moved. A rail includes an angled portion which provides a handle allowing the ladder to be easily moved. The wheels are preferably mounted above the ground by a distance between its radius and its diameter such that when the ladder is supported on the wheels, the legs will not interfere with the ground.

The above described apparatus' would seem to add unneeded complication to a rather simple device, the ladder. The movable and retractable casters described add weight, size and cost to the ladder assemblies. They also require that the assembly have a large footprint which increases the storage space needed. They also seem impracticable for fixed or non-collapsible ladders used to climb to a great height. In addition, the casters and wheels of such assemblies are not easily transferrable to another ladder, adding to the total cost of ladder inventories needed by maintenance organizations. Because of the need to have the ladder's legs rest securely on a supporting surface, a great deal of attention must be paid to the security of any retraction mechanism. Problems arise with prior art ladders having spring-loaded wheels which are biased into the supporting surface and require a user's weight on the ladder to force the legs into contact with the ground for firm support. A user sometimes has the impression that the ladder is not sturdy, an undesirable condition.

Therefore, it is an object of the present invention to provide methods and apparatus to easily transport a ladder which does not have the undesirable characteristics of the schemes described above.

Another advantage of the present invention is to allow the ladder to be transported on edge since it may be required to pass through narrow doorways. Placement of a wheel attachment in respect of the ladder leg should permit the use of a pivot pin for castering, enhancing the maneuverability of the object when being transported on edge or otherwise.

It is also an object of the present invention to provide a wheeled attachment that need not be disengaged and removed from the ladder before the ladder can be erected for use. If the invention does not interfere with the ladders erection or support, it may always be left in place. Moreover, the ladder should be easily lowered to the transport position by one person by "walking" the ladder backward until the lower end rests on the transport wheel or wheels, and vice versa. Wheels should be wide, eliminating the necessity of adjusting them accurately under the plane of weight symmetry.

Yet another advantage of the present invention is to attach almost universally to any type and size of ladder so it can easily be moved from one ladder and placed on another. While a manufacturer can install the invention on new products, a user can use the invention on already-acquired ladders.

The development of a simple ladder transportation system which would reduce or obviate the need for retraction, weight, size and cost, yet still allow one person to easily maneuver and transport a ladder from place-to-place without injury, would constitute a major advance and would satisfy a long felt need in the construction and maintenance industries.

SUMMARY OF THE INVENTION

The present invention, Ladder Transport System, provides methods and apparatus to aid a user in transporting the ladder from place to place. Means for affixing a supporting wheel near the end and the edge of a ladder leg are described. The wheel may be allowed to pivot or "caster" for enhanced maneuverability. In a preferred embodiment, the wheel assembly comprises dual caster wheels, of approximately two-inches diameter or larger. The axes of rotation of the wheels are disposed orthogonally so that at the users option the ladder can be transported on edge or with its face horizontal. The wheel size may be adjusted to the size and type of the ladder to be transported. The Ladder Transport System, called Ladder Dolly™ by the inventors, can be affixed to nearly any existing ladder, permanently or removably. If desired, two dual-caster wheel assemblies can be used, each one being installed on a principal leg of the ladder. The removable wheel assembly is attached preferably with a single clamp screw, but may be permanently affixed to the ladder, for example, with welds, rivets or bolts.

A permanent or removable wheel of the present invention can be applied to nearly any type of ladder at the point of manufacture. A ladder manufacturer can adapt the invention to his specific type of equipment. The ladder may be one piece, or a multi-segment extension ladder. It may range from a simple step-ladder to a multi-story firemen's ladder. It may be of wood, metal or other suitable material.

The caster wheel revolves on an axle which is supported at each end by a wheel bracket. The closed side of the wheel bracket, which parallels the axle, is joined to the back side of a "C" clamp—that is the side of the "C" clamp which is opposite the ladder surfaces against which the clamp frame rests. The wheel bracket may be solidly fixed to the clamp frame or allowed to swivel on a pin about a pivot axis. The clamp frame is placed against the outside surface of a leg of the ladder and the threaded screw of the clamp is tightened down against the flat, inside surface of the ladder's leg. The clamp frame is oriented so that when assembled to one end of a ladder's leg and the ladder is placed with the side of that leg facing a supporting surface, usually the ground or floor, a wheel lies tangent to the supporting surface. The wheel will roll on that supporting surface when a person picks up the free end of the ladder and carries it along.

In a dual-caster wheel assembly, a second caster wheel, approximately identical to the first caster wheel, is disposed on the clamp frame orthogonal to the first caster wheel. The second caster wheel revolves on an axle which is supported at each end by a second wheel bracket. The closed side of the second bracket which parallels the second axle is joined to the side of the clamp frame.

If two dual-caster wheel assemblies are attached to a ladder, one on each principal leg, the ladder may be rotated with its face parallel to the ground or floor, so the ladder end rests on two wheels. This configuration will stably support very large ladders. The ladder can then be propelled by a person carrying the free end in the manner of a wheelbarrow. When the wheel assembly or assemblies are so attached at one end of the ladder, and the opposite end is supported by a person, the wheel assembly or assemblies can be made to carry a large portion of the weight of the ladder. This relieves the person who must carry a ladder from place-to-place of considerable stress to his or her arms, shoulders, back, wrists, ankles, knees, etc. The portion of weight supported by the person is, of course, the ratio of distance from the center of the wheel to the center of gravity of the ladder to distance from the center of the wheel to where the person grasps the ladder. Thus, repeated use is much less stressful than carrying the entire weight of the ladder. For persons who use ladders frequently in their occupations such as firemen, electricians, carpenters, handymen and tradesmen, the Ladder Dolly™ can help prevent personal injuries caused by the repeated use and transport of ladders. In addition, with the wheel assembly or assemblies so affixed, even very large ladders are easily maneuvered over most types of terrain.

A carrying handle, in one preferred embodiment fabricated of Velcro™ material, may be attached to the ladder leg's at the free end of the ladder. The handle allows the user to carry and pull the ladder while leaving one hand free to open doors or perform other operations.

An alternate embodiment of the Ladder Dolly™ features two single-caster wheel assemblies, each one being installed on a principal leg of a ladder with the rotational axes of the wheels lying in a plane parallel to the face or width of the ladder.

The invention is a useful tool in virtually any industry, office or home where ladders are used, but especially in the construction and maintenance industries. Because of the placement of the wheel assembly, it is possible for one person to maneuver a ladder through and around narrow passageways such as doorways and around corners. The ladder with attached wheels can be erected and operated without inhibiting or interfering with the normal opening, closing, extending or retracting functions.

The present invention is also useful for elderly persons, particularly homeowners who have only occasional need to use a ladder. The Ladder Dolly™ will undoubtedly become an indispensable part of manufactured ladders and will be sold to present ladder owners.

An appreciation of the other aims and objectives of the present invention and a more complete and comprehensive understanding of this invention may be obtained by studying the following description of a preferred embodiment, and by referring to the accompanying drawings.

A BRIEF DESCRIPTION OF THE DRAWINGS

Figure 5:
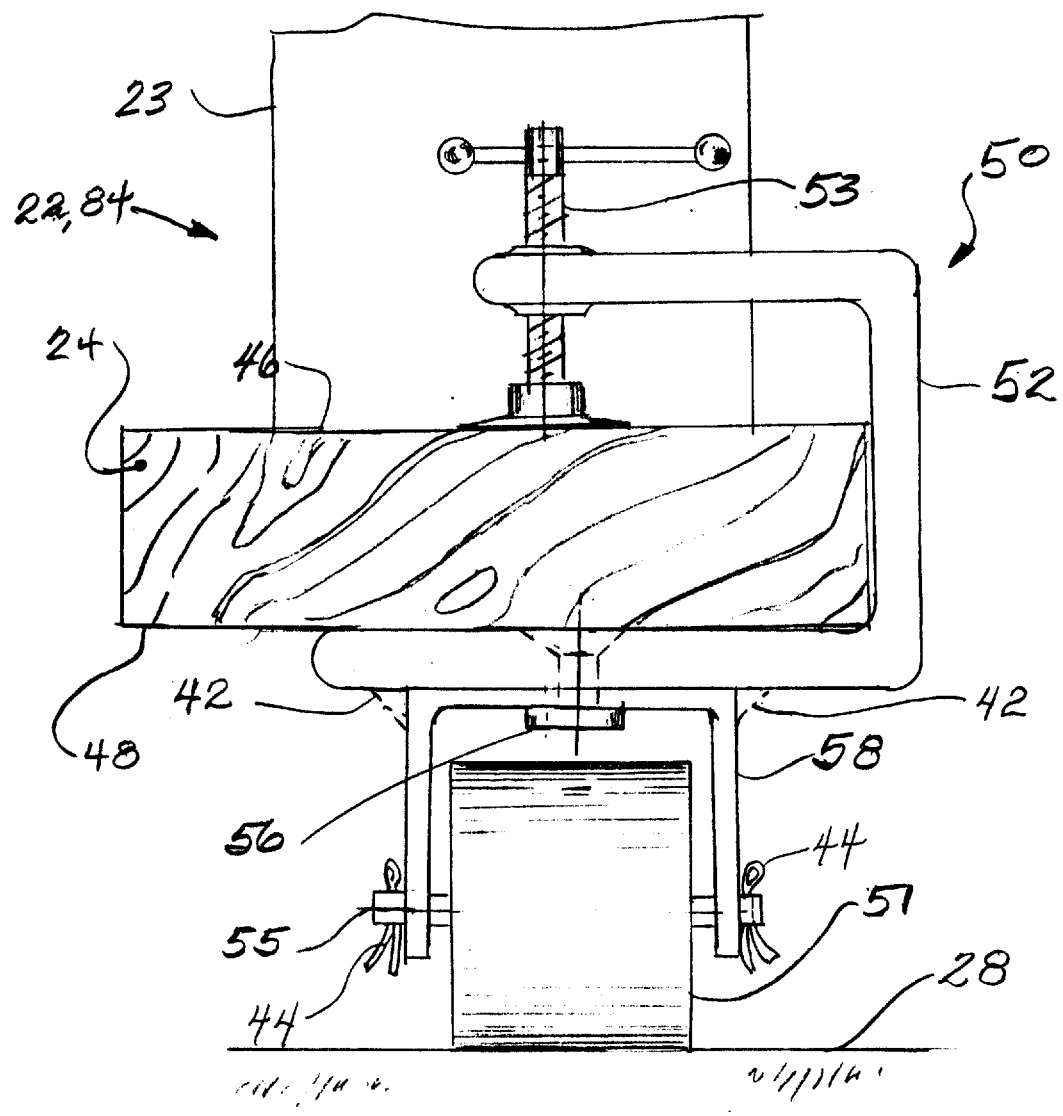

FIG. 5 reveals an elevation view, seen from the ladder end, of a single-caster assembly, used in an alternate embodiment of the present invention by a person to easily transport a large ladder, showing its non-interfering attachment to a ladder leg.

Figure 6:
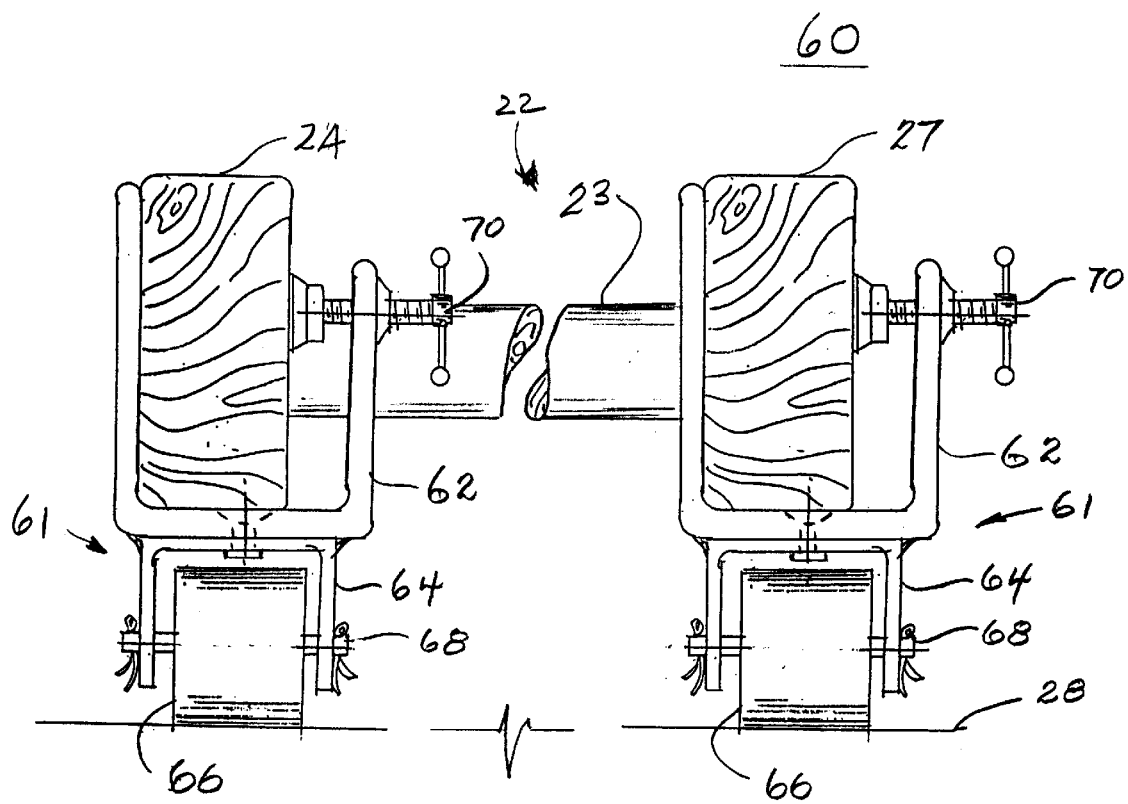

FIG. 6 is an elevation view, seen from the ladder end, of two single-caster wheel assemblies used in an alternative embodiment of the present invention by a person to easily transport a large ladder or step ladder, showing its non-interfering attachment to the ladder legs.

Figure 7:
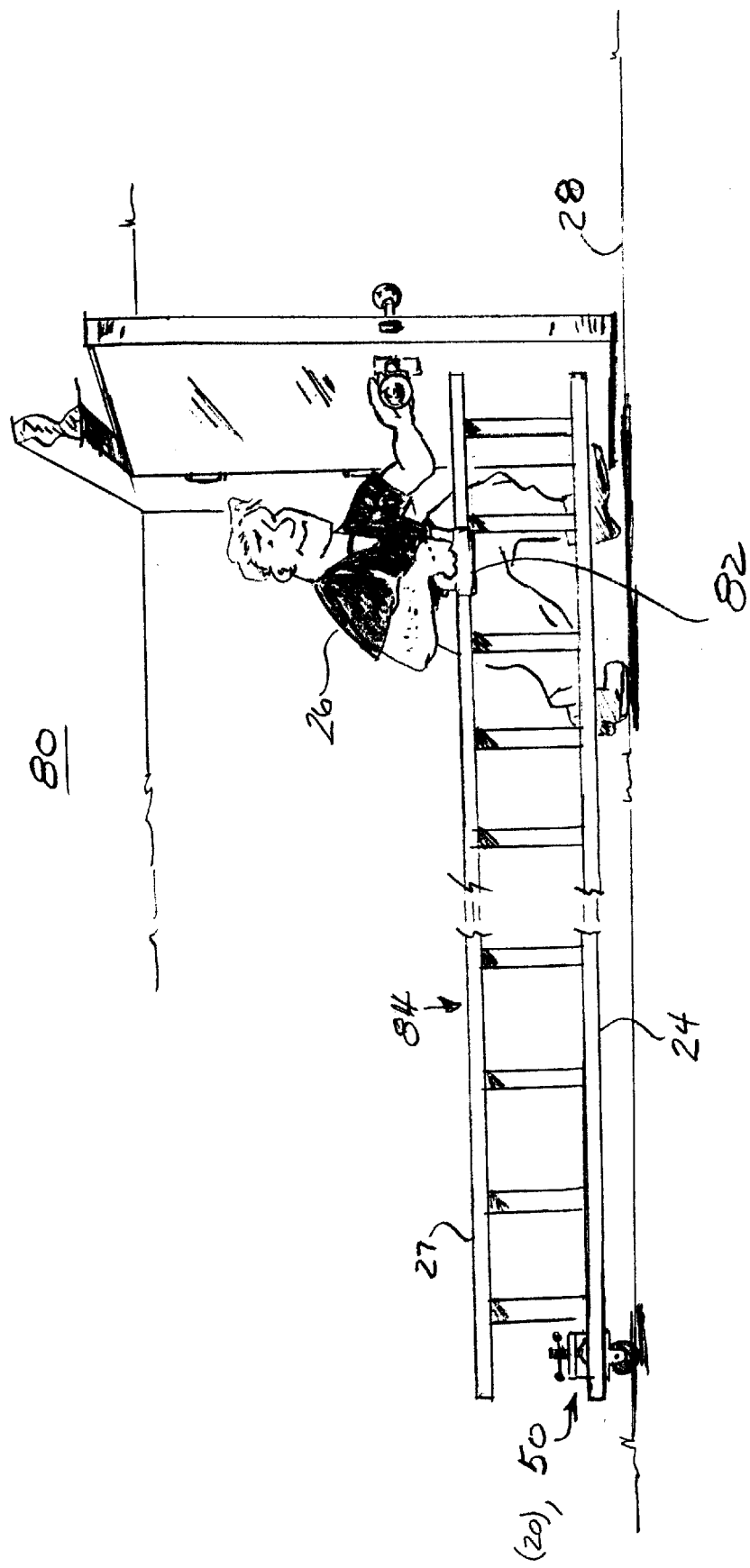

FIG. 7 is a an illustration which depicts a user transporting a conventional large ladder with the aid of one single or dual-caster Ladder Dolly™ and a carrying handle which allows one hand free for other operations.

Figure 8:
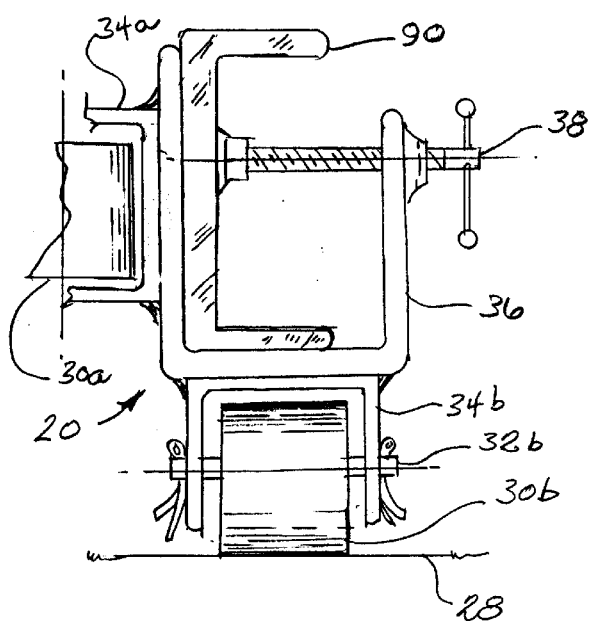

FIG. 8 presents an elevation view, seen from the ladder end, of a dual-caster wheel assembly clamped to a channel-shaped, metal ladder leg, the ladder leg resting on edge in the clamp frame, showing the ability of the Ladder Dolly™ to attach to various types of ladder construction and material.

Figure 9:
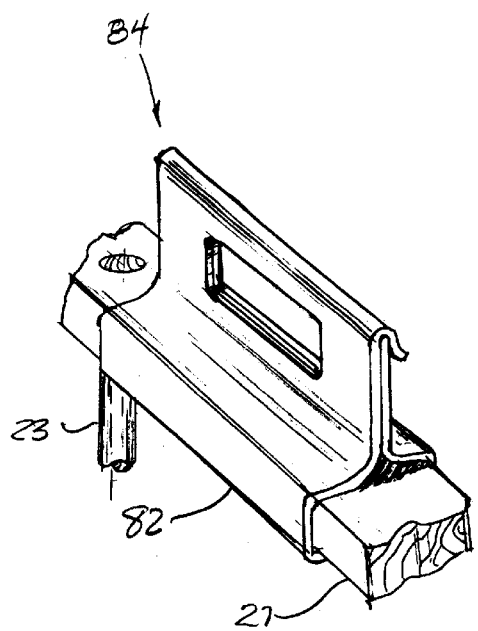

FIG. 9 is a perspective view of a carrying handle made from Velcro™ material wrapped around the ladder leg, which allows the user to transport the ladder with one hand free.

Figure 10:
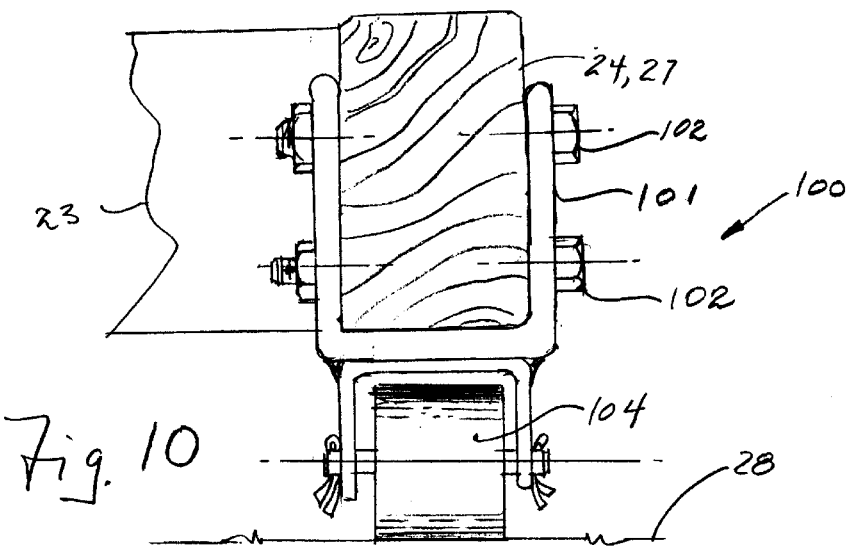

FIG. 10 presents an elevation view, seen from the ladder end, of a single-caster wheel assembly non-removably connected to a ladder leg, as most likely used on a newly manufactured ladder.

A DETAILED DESCRIPTION OF PREFERRED & ALTERNATIVE EMBODIMENTS

Figure 1:
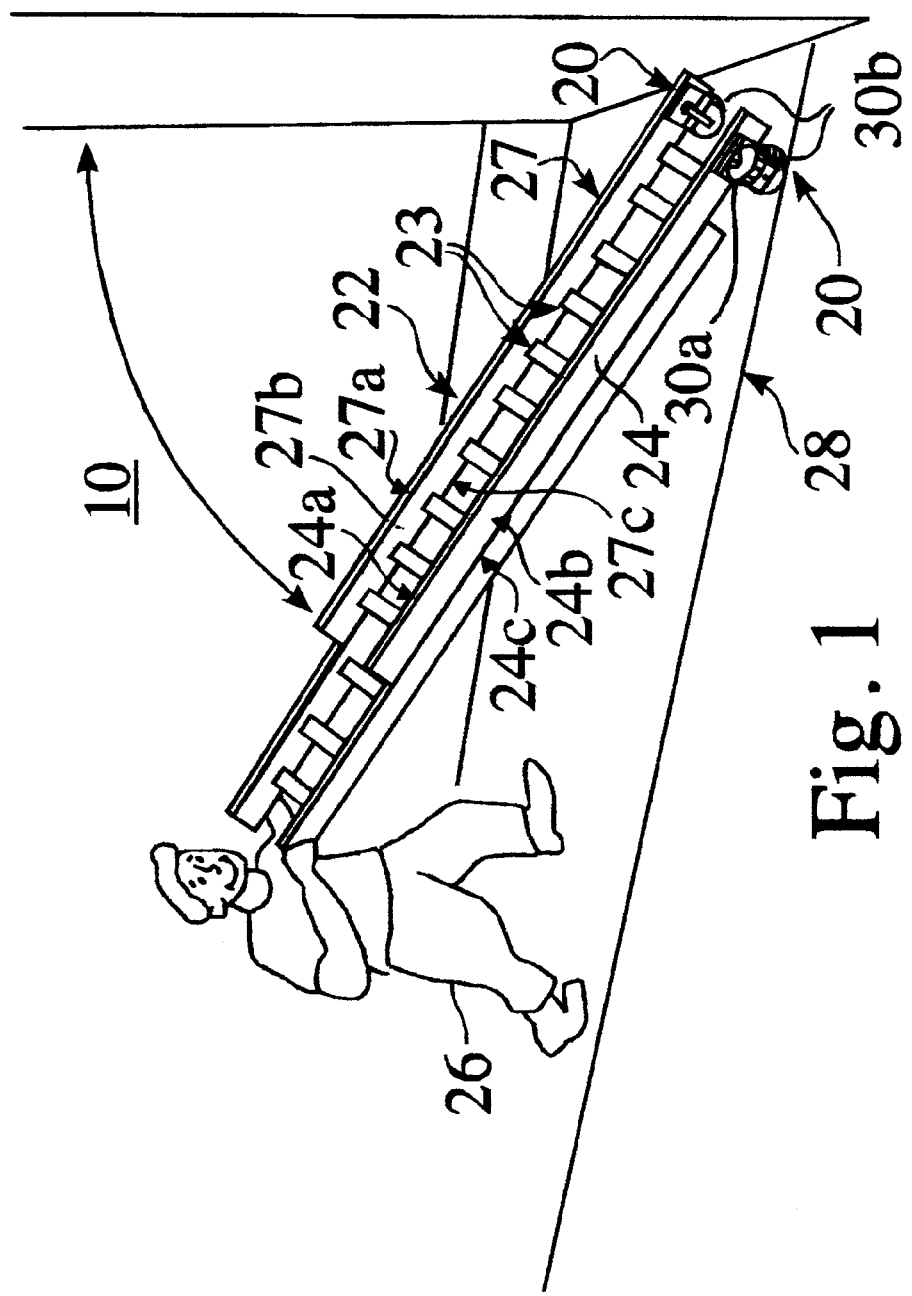
FIG. 1 is an illustration which shows a user transporting a conventional extension ladder from one job site to another with the aid of the Ladder Transport System (Ladder Dolly™) which is affixed at an end of the ladder and does not interfere with erection and use of the ladder.

The present invention comprises methods and apparatus for affixing a wheel assembly near the end and the outside of a ladder leg, by any suitable means in order to aid a user in transporting the ladder. FIG. 1 illustrates one preferred embodiment of the Ladder Transport System, 10, called Ladder Dolly™ by the inventors. A dual-caster wheel assembly 20 is affixed to each leg 24 of a conventional ladder 22, permanently or removably. Each dual-caster wheel assembly 20 is affixed near the end of the ladder 22. The ladder face in this embodiment is oriented parallel to the support surface 28, usually the ground or floor. The wheels are allowed to rest on the support surface 28. A user 26 grasps the ladder 22 at its free end, opposite the end where the dual-caster wheel assemblies 20 are affixed, and by lifting the ladder 22 and pushing or pulling it along, wheelbarrow style, can easily guide the ladder 22 as he or she moves it from place-to-place. The ladder 22 may be one piece, or a multi-segment extension ladder. It may range from a simple step-ladder to a multi-story firemen's ladder.

A second caster wheel 30b, approximately identical to the first caster wheel 30a, is disposed orthogonal to the first caster wheel 30a. The wheel assembly 20 is oriented so that when it is assembled at one end of a ladder's leg 24 and a face of the ladder 22 is placed facing a supporting surface 28, usually the ground or the floor, the second caster wheel 30b lies tangent to the supporting surface 28. As depicted in FIG. 1, the second caster wheel 30b will roll on the supporting surface 28 when a person 26 picks up the opposite end of the ladder 22 and carries it along.

When the wheel assembly 20 is so attached, and the ladder 22 is supported at the opposite end by a person 26, the wheel assembly 20 can be made to carry a large portion of the weight of the ladder 22. The portion of weight supported by the person 26 is, of course, the ratio of distance from the center of the wheel 30b to the center of gravity of the ladder 22 to the distance from the center of the wheel 30 to the place where the person 26 grasps the ladder 22.

Figure 2:
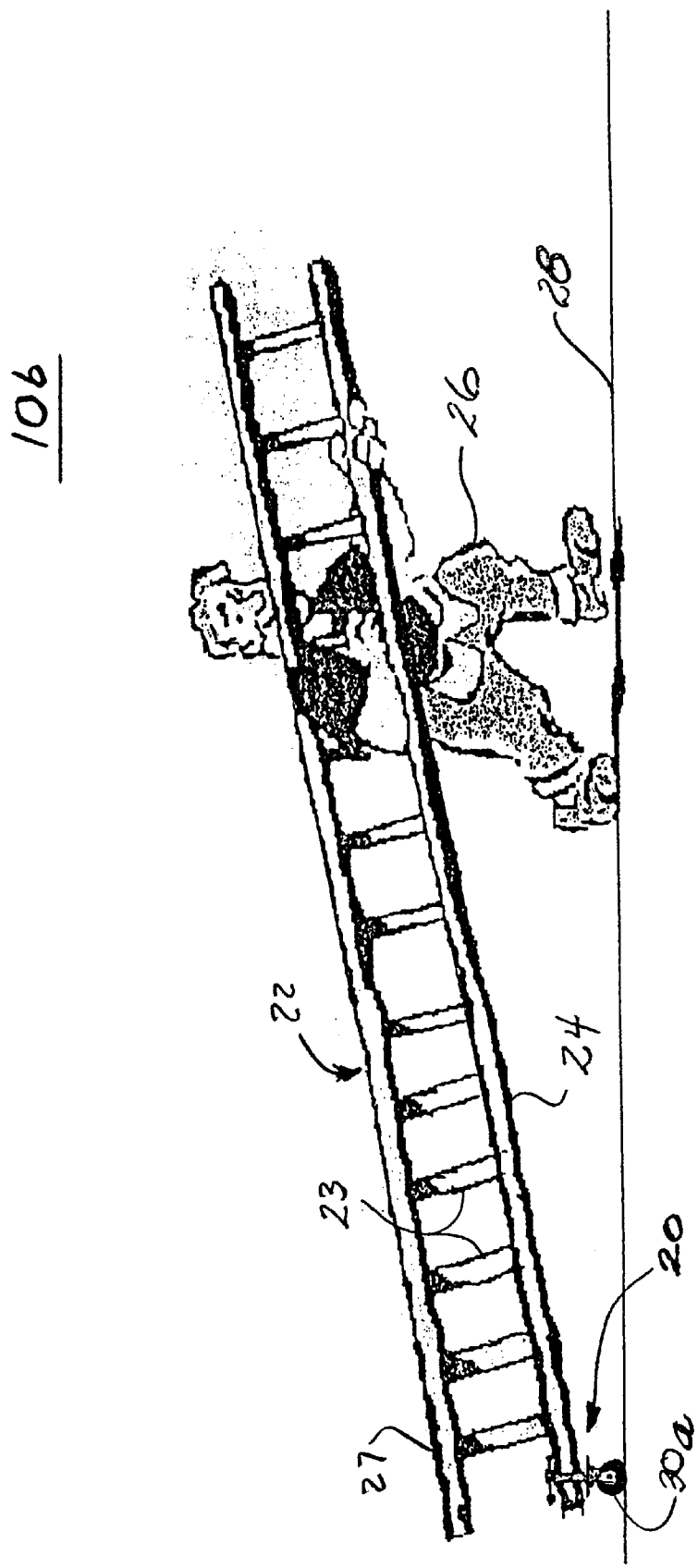
FIG. 2 is an illustration of a Ladder Dolly™ system illustrating its simple, non-interfering attachment to a leg of a conventional, long ladder.

FIG. 2 shows an alternative embodiment of the Ladder Transport System 10b. A caster wheel assembly 20 is affixed to one leg 24 of a conventional ladder 22, permanently or removably. The wheel assembly 20 is affixed near the end of the ladder 22. The ladder face in this case is oriented perpendicular, and a side of the ladder leg 24, 27 is oriented parallel, to the support surface 28, ground or floor. The first caster wheel 30a is allowed to rest on the support surface 28. A user 26 grasps the ladder 22 at its free end, opposite the end where the caster wheel assembly 20 is affixed and by lifting the ladder 22, and pushing or pulling it along, can easily guide the ladder 22.

Figure 3:
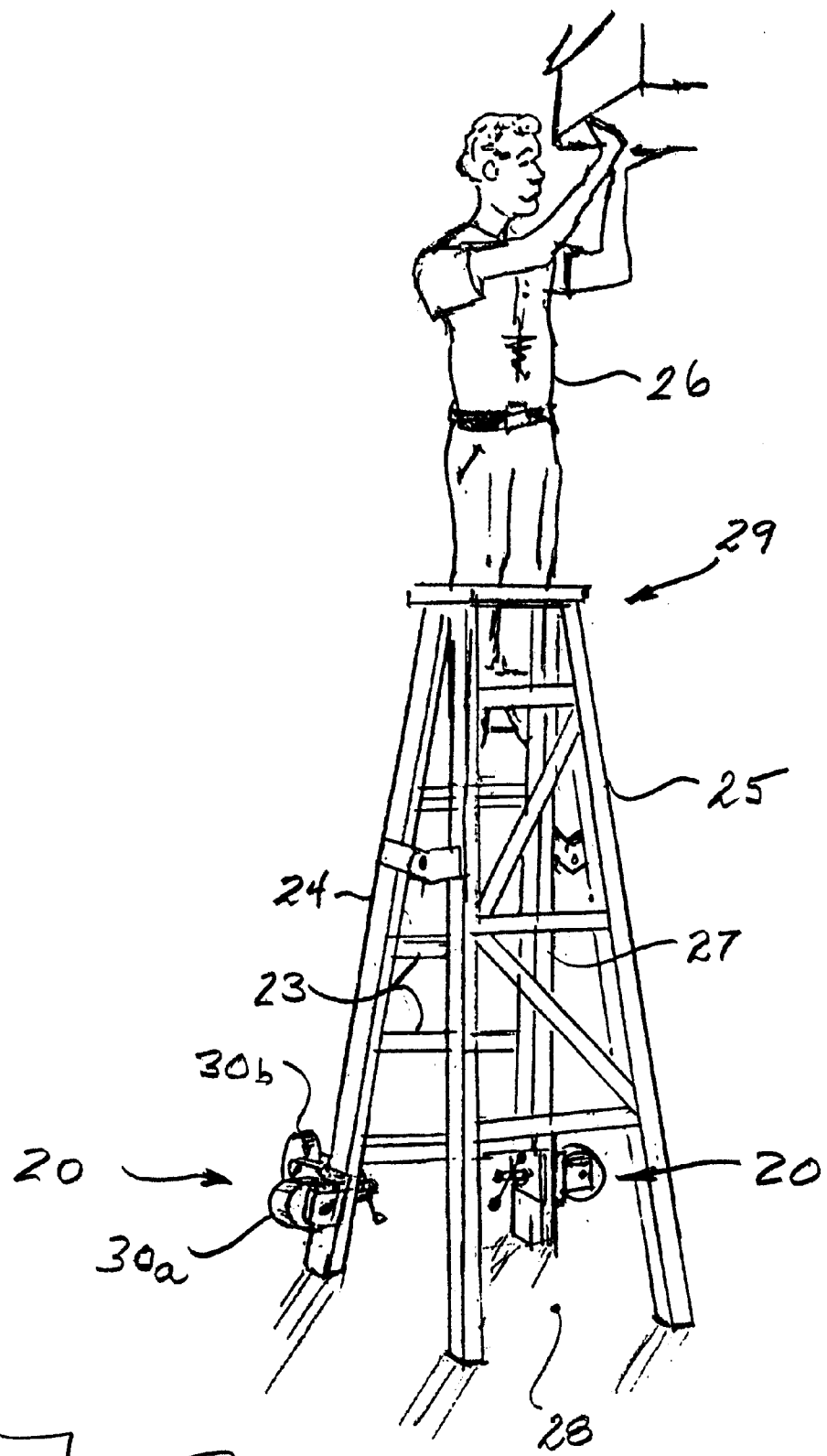
FIG. 3 is a perspective view of a Ladder Dolly™ system showing its simple non-interfering attachment to the a legs of a large step ladder.

FIG. 3 depicts dual-caster wheel assemblies 20 clamped to the principal legs 24,27 of a step ladder 29. It is easily seen that by folding the auxiliary legs 25 against the principal legs 24 and leaning the stepladder 29 back toward the user 26, the second caster wheel 30b will contact the support surface 28, ground or floor and thus permit the stepladder 29 to be transported easily with the ladder face parallel to the ground or floor 28. Alternatively, the user can fold the stepladder 29, orient it on edge and transport it in that manner on one first caster wheel 30a.

Figure 4:
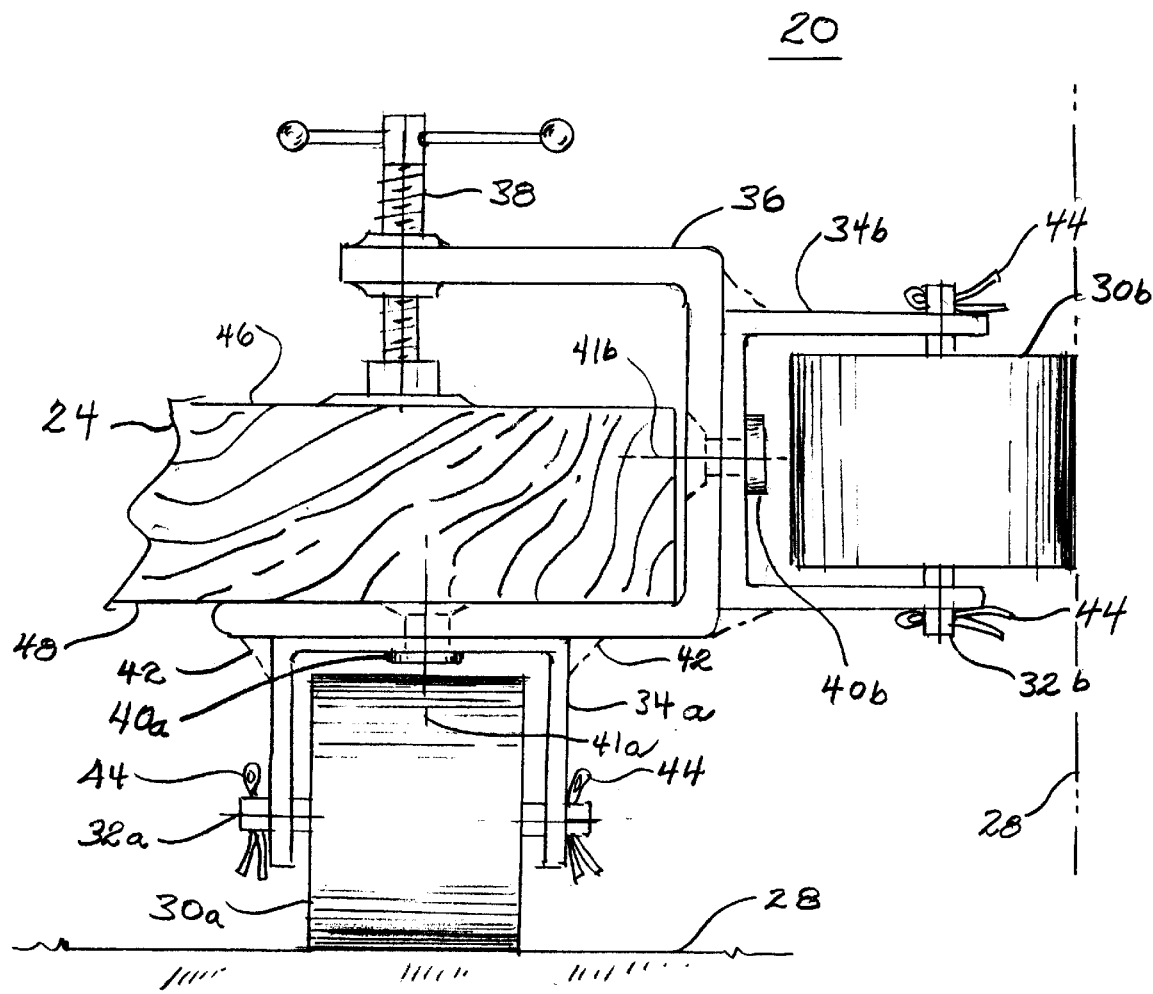
FIG. 4 is an elevation view of a removably affixed, dual-caster assembly, seen from the ladder end. The system is used by a person to easily transport a ladder, showing its non-interfering attachment to a ladder leg according to the present invention.

FIG. 4 depicts a preferred embodiment of a dual-caster wheel assembly 20. A first caster wheel 30a is disposed in a clamp frame 36. The first caster wheel 30a is approximately two-inches diameter or larger. The size of the wheel 30a may be adjusted to carry the weight of the size and type of the ladder 22 to be transported. The first caster wheel 30a revolves on an axle 32a which is supported at each end by a wheel bracket 34a. The closed side of the wheel bracket 34a which parallels the axle 32a is joined to the back side of a C-shaped clamp frame 36—that is the side which is opposite a threaded clamp screw 38. The wheel bracket 34a may be solidly fixed to the clamp frame 36 by welding 42, riveting, bolting or similar joining process. Or, preferably, it may be allowed to swivel on a pivot pin 40a about a pivot axis 41a. The clamp frame 36 is placed against a side 48 of a ladder's leg 24 and the threaded screw 38 is tightened against a flat, inside surface 46 of the ladder's leg 24.

The ladder leg 24 illustrated is of one type of ladder 22 made, for example, from wood. The reader will appreciate that ladders 22 made also be made from metal or other materials and have various cross-sections.

A second caster wheel 30b is disposed on the clamp frame 36, orthogonally to the first caster wheel 30a. It revolves on an axle 32b which is supported at each end by a wheel bracket 34b. The closed side of the wheel bracket 34b which parallels the axle 32b is joined to the side of the C-shaped clamp frame 36. The wheel bracket 34b also may be solidly fixed to the clamp frame 36 by welding, riveting, bolting or similar joining process. Or, preferably, it may be allowed to swivel on a pivot pin 40b about a pivot axis 41b. The invention as illustrated can be easily assembled to nearly all types of ladders 22 and easily adapted to others if necessary.

FIG. 5 shows in elevation view, seen from the ladder end, of a single-caster assembly 50, used in an alternate embodiment of the present invention. The wheel assembly 50 is oriented to easily transport a large ladder on its edge as was also depicted in FIG. 2. While less versatile than the dual-caster wheel assembly 20 this configuration of single caster-wheel assembly 50 is less expense than the dual-caster wheel device 20. The clamp frame 52 is only provided with one wheel bracket 34 on which a caster wheel 57 revolves on axle 55. A pivot pin 56 . . . 32. A pivot pin 40 connects the bracket 34 to the clamp frame 52 between the two sides of the ladder legs 24, 27. Each leg 24 and 27 of the ladder 22 has three sets of surfaces: a front surface 24a, 27a; two side surfaces, 24b, 27b; and back surfaces 24c, 27c. As before, weldment 42 or other fasteners my be used to connect the bracket 34 to the clamp frame 36.

FIG. 6 presents an alternative embodiment of the invention suitable for adding stability when a person 26 must transport a very large ladder 84. In this embodiment, a first single-caster wheel assembly 61 is affixed along the edge of one ladder leg 24, a second single-caster wheel assembly 61 is affixed along the edge of a second leg 27, and each wheel assembly 61 is aligned with the other along the ladder's length.

FIG. 7 depicts a user transporting a conventional ladder 84 with the aid of the wheel assembly 20 and a carrying handle 82 which allows one hand free for other operations such as opening a door. The carrying handle 82 is affixed to the ladder 84 on a leg 27 opposite to ladder leg 24, and to an end of said ladder assembly 84 opposite the extreme end to which the wheel assembly 20 is affixed. The carrying handle 82 in a preferred embodiment is made of Velcro™ hook-and-loop fabric which is wrapped around the ladder leg 27 and secured with hand pressure. The reader will appreciate that other materials and methods of attachment may be used for the carrying handle 82.

FIG. 8 presents an elevation view, seen from the ladder end, of a dual-caster wheel assembly 20 clamped to a channel-shaped, metal ladder leg 90. The ladder leg 90 rests on edge in the clamp frame 36. The ability of the Ladder Dolly™ to attach to various types of ladder construction and material is illustrated.

FIG. 9 is a perspective view of a carrying handle 82 made from Velcro™ sheet which is wrapped around the ladder leg 27 and pressed together on contact. The handle 82 allows the user to transport the ladder assembly 84 with one hand free.

In FIG. 10, a wheel assembly 100, non-removably connected to a ladder leg 102, is seen from the ladder end. In this illustration, the ladder face is oriented parallel to the support surface 28.

Conclusion

Although the present invention has been described in detail with reference to one or more preferred embodiments, persons possessing ordinary skill in the art to which this invention pertains will appreciate that various modifications and enhancements may be made without departing from the spirit and scope of the claims that follow. The various alternatives for providing a Ladder Transport System that have been disclosed above are intended to educate the reader about preferred embodiments of the invention, and are not intended to constrain the limits of the invention or the scope of claims. The List of Reference Characters which follows is intended to provide the reader with a convenient means of identifying elements of the invention in the Specification and Drawings. This list is not intended to delineate or narrow the scope of the claims.

List of Reference Characters

FIGS. 1, 2, 3 and 4
- 10 Method of ladder transport using attachable, dual caster wheel assemblies
- 10b Alternate method of ladder transport using attachable single or dual caster
- 20 wheel assemblies
- 21 Dual caster wheel assembly
- 22 Ladder assembly
- 23 Ladder steps
- 24 First ladder leg
- 24a Front surface of leg
- 24b Side surface of leg
- 24c Back surface of leg
- 25 Auxiliary stepladder legs
- 26 User
- 27 Second ladder leg
- 27a Front surface of leg
- 27b Side surface of leg
- 27c Back surface of leg
- 28 Support surface, floor or ground
- 29 Stepladder
- 30a First caster wheel
- 30b Second caster wheel
- 32a First axle
- 32b Second axle
- 34a First wheel bracket
- 34b Second wheel bracket
- 36 Dual caster clamp frame
- 38 Clamp screw assembly
- 40a First pivot pin attachment
- 40b Second pivot pin attachment
- 42 Alternative fillet weld attachment
- 44 Cotter pin FIG. 5
- 22 Ladder assembly
- 23 Ladder step
- 24 Ladder leg
- 28 Support surface, floor or ground
- 42 Alternative fillet weld attachment
- 44 Cotter pin
- 46 Inside surface of ladder leg
- 48 Outside surface of ladder leg
- 50 Single caster wheel assembly
- 51 Caster wheel
- 52 Single caster clamp frame
- 53 Clamp screw assembly
- 55 Axle
- 56 Pivot pin attachment
- 58 Wheel bracket FIG. 6
- 23 Ladder step
- 24 First ladder leg
- 27 Second ladder leg
- 28 Support surface, floor or ground
- 60 Alternative transport with two single caster wheel assemblies
- 61 Alternative single caster wheel assembly
- 62 Alternative single caster frame clamp
- 64 Wheel bracket
- 66 Caster wheel
- 68 Axle
- 70 Clamp screw FIG. 7
- 24 First ladder leg
- 26 User
- 27 Second ladder leg
- 28 Support surface, floor or ground
- 50 Dual caster wheel assembly
- 80 Method of ladder transport using attachable single or dual caster wheel assemblies and attachable carrying handle
- 82 Carrying handle
- 84 Long ladder assembly with handle FIG. 8
- 20 Dual-caster wheel assembly
- 28 Support surface (ground or floor)
- 30a First caster wheel
- 30b Second caster wheel 32b Second axle
34a First wheel bracket
34b Second wheel bracket
36 Clamp frame
38 Clamp screw
90 Metal ladder leg (extruded, machined or formed)
   FIG. 9
27 Second ladder leg
23 Ladder step
84 Ladder assembly with handle
82 Velcro™ handle
   FIG. 10
23 Ladder step
24 Ladder leg
27 Ladder leg
28 Support surface
100 Single caster wheel assembly, non-removably connected
101 Single caster wheel assembly frame
102 Bolts/fasteners
104 Single caster wheel

What is claimed is:

1. An apparatus comprising:

a ladder assembly (84); said ladder assembly (84) having a plurality of legs (24, 27) and a plurality of steps (23); each of said legs (24, 27) including a front surface (24a, 27a); two side surfaces (24b, 27b); and a back surface (24c, 27c);

a wheel assembly (50) for supporting an end of said ladder assembly (84); said wheel assembly (50) being removably affixed to said end and at an edge of one of said plurality of legs (24, 27);

said wheel assembly (50) being adapted and free to roll on a supporting surface (28) when a face of said ladder assembly (84) is oriented orthogonally to supporting surface (28); and said wheel assembly (50) being aligned so as to support a substantial portion of weight of said ladder assembly (84) while being able to roll on said supporting surface (28); said wheel assembly (50) being located on a side surface (24b, 27b) of said plurality of legs (24, 27);

said wheel assembly (50) being located on said ladder assembly (84) in a position which does not interfere with erection or use of said ladder assembly (84); and a user (26), by grasping an end of said ladder assembly (84) opposite to said extreme end to which said wheel means (50) is affixed, being then able to easily maneuver said ladder assembly (84) from one location to another.

* * * * *